United States Patent
Carrillo

(10) Patent No.: US 6,559,652 B2
(45) Date of Patent: May 6, 2003

(54) METHOD OF STATISTICALLY BALANCING CURRENT TRANSFORMER MEASUREMENTS FOR DIFFERENTIAL BUSBAR PROTECTION

(75) Inventor: Jean-Jacques Carrillo, Montauban (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/987,640

(22) Filed: Nov. 15, 2001

(65) Prior Publication Data

US 2002/0060562 A1 May 23, 2002

(30) Foreign Application Priority Data

Nov. 17, 2000 (FR) .............................. 00 14948

(51) Int. Cl.[7] ................ G01R 31/08; G01R 29/16; G01R 1/20; G01F 19/00
(52) U.S. Cl. ................ 324/522; 324/521; 324/107; 324/127; 702/59
(58) Field of Search ................ 324/522, 521, 324/523, 525, 127, 547, 117 R, 117 H, 107, 86; 702/57, 58, 59, 62, 64

(56) References Cited

U.S. PATENT DOCUMENTS 5,367,425 A 11/1994 Saha et al. ............... 361/63
5,835,325 A 11/1998 Tripodi et al. ............ 361/94
5,839,093 A * 11/1998 Novosel et al. ........... 702/59

OTHER PUBLICATIONS

Hosemann, G. et al., "Model Saturation Detector For Digital Differential Protection", IEEE Transactions on Power Delivery, US, IEEE Inc., New York, vol. 8, No. 3, Jul. 1, 1993, pp. 933–940, XP000403086.

* cited by examiner

Primary Examiner—Christine Oda
Assistant Examiner—James C. Kerveros
(74) Attorney, Agent, or Firm—Sughrue Mion, PLLC

(57) ABSTRACT

The method of correcting measurements is intended to limit the risk of unnecessary tripping of a differential phase current protection system that computes the vector sum of the currents of an area to determine the differential current between the inputs and outputs of said area in the course of regular tests. It is based on a statistical balancing method using measured current vectors each obtained from a measurement of the real current vector supplied at the time of each test by a current transformer, and it uses at the time of at least one test an iterative convergence algorithm for determining from the erroneous differential current vector formed by the sum of the measured current vectors the correction vector to be applied to each measured current vector in order to correct statistically the erroneous differential current vector.

8 Claims, 3 Drawing Sheets

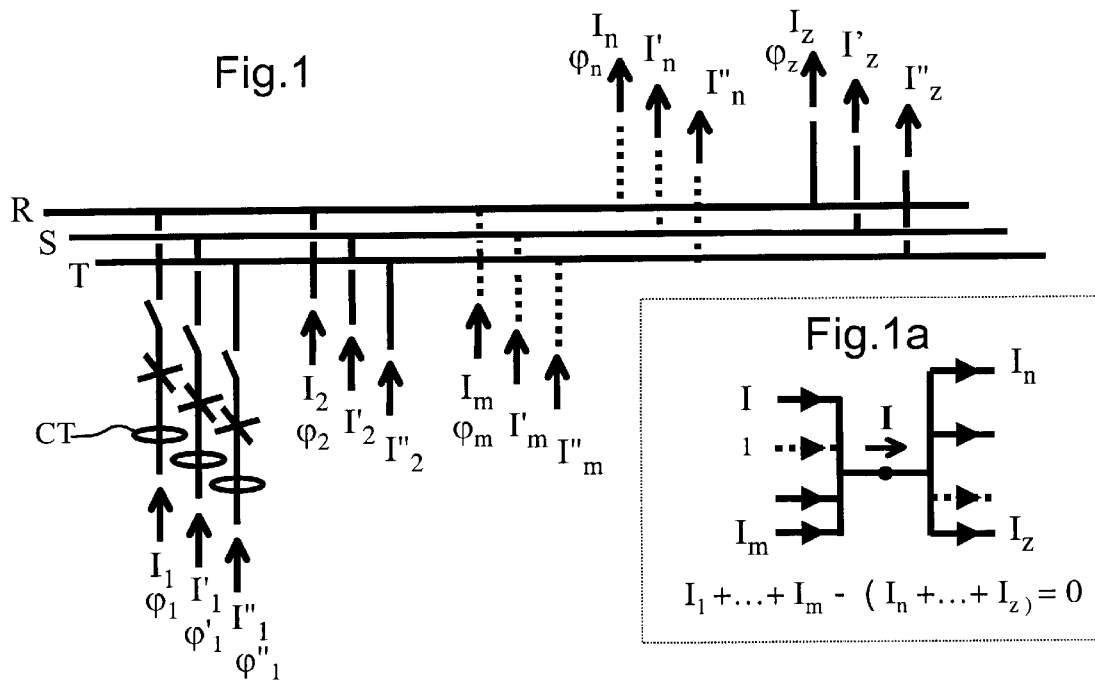
Fig. 1
Fig. 1a
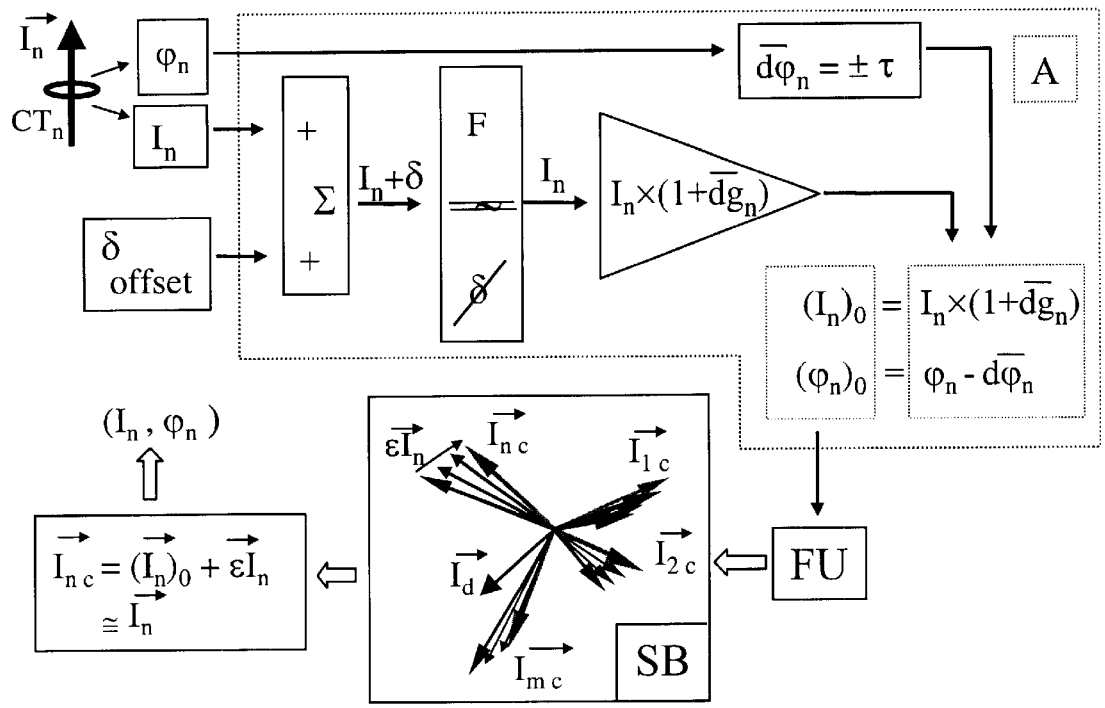
Fig. 2

METHOD OF STATISTICALLY BALANCING CURRENT TRANSFORMER MEASUREMENTS FOR DIFFERENTIAL BUSBAR PROTECTION

The invention relates to a method of correcting measurements from current transformers at inputs and outputs of a current node defined by an area and by one phase of a set of busbars. The method is intended to limit the risk of unnecessary tripping of a differential protection system assigned to one phase current of the set of busbars.

BACKGROUND OF THE INVENTION

Conventional differential protection systems calculate, during regular tests, the vector sum of the currents of a phase to determine the differential current $I_d$ between the inputs and outputs of the protected area. A null differential current is sensed in the absence of faults in the area and a significant differential current is sensed in the event of a short circuit generating a fault current or in the event of a leakage current to earth on a busbar carrying the phase. The detection of real fault currents (including leakage currents) is relatively reliable with a differential protection system assigned to an area comprising a limited number of feeder bays, and therefore a limited number of current transformers, typically ten transformers. On the other hand, if the set of busbars includes a large number $N_{TC}$ of current transformers in the protected area, a conventional differential protection system is not protected from unnecessary tripping resulting from the absence of statistical compensation for the gain errors of each transformer. Most feeder bays of a substation are two-way and can therefore supply or consume energy. For a given phase, the sum of the sensed currents entering an area is equal to the sum of the sensed currents leaving it. Current transformers usually have a positive or negative gain error dg and the measured current $(I)_0$ is therefore equal to $I\times(1\pm dg)$, where I is the true current. Assuming an extreme case in which all the input transformers have a mean positive gain error equal to $dg_0$ and all the output transformers have a mean negative gain error equal to $-dg_0$, and assuming for simplicity that there are the same number of input and output transformers and that each transformer is carrying the same current I, an erroneous differential current $(I_d)_0$ equal to $1\times N_{TC}\times dg_0$ is measured, which is not acceptable if the set of busbars includes a large number $N_{TC}$ of transformers. This is because, if $dg_0$ is of the order of 1% and $N_{TC}$ is equal to about fifty, the erroneous differential current $(Id)_0$ measured is approximately equal to half the current I passing through a transformer. The differential protection system cannot distinguish this erroneous current from the real differential current caused by a busbar fault, and is therefore tripped even in the absence of a fault.

OBJECTS AND SUMMARY OF THE INVENTION

To remedy the above drawbacks, the applicant has developed a method of statistically balancing current transformer measurements in order to apply statistical correction to the errors of transformers assigned to differential busbar protection. The statistical nature of the correction implies that, although errors are corrected globally, an individual correction to the initial measurement from a transformer can lead to a value that is worse than the initial value, i.e. farther from the true value. Nevertheless, the set of corrections statistically balances the global error for all the transformers, which yields a corrected measurement of the differential current for which the residual error is only a small percentage, typically of the order of the percentage gain error for a single transformer.

The invention therefore provides a method of correcting measurements from current transformers disposed at inputs and outputs of a current node defined by an area and by one phase of a set of busbars, intended to limit the risk of unnecessary tripping of a differential phase current protection system, said differential protection system calculating the vector sum of the currents to determine the differential current $I_d$ between the inputs and outputs of said area in the course of regular tests, which method is based on a statistical balancing method using measured current vectors $(\vec{I_n})_0$ each obtained from a measurement of the current $I_n$ and the relative phase $f_n$ of the real current vector $\vec{I_n}$ supplied at the time of each test by a current transformer $CT_n$, and it uses at the time of at least one test an iterative convergence algorithm for determining from the erroneous differential current vector $(\vec{I_d})_0$ formed by the sum $\Sigma(\vec{I_n})_0$ of the measured current vectors the correction vector $\epsilon\vec{I_n}$ to be applied to each measured current $(\vec{I_n})_0$ to obtain a corrected current vector $\vec{I_n}_c$ substantially equal to the real current vector $\vec{I_n}$. The statistical balancing method corrects said erroneous differential current vector $(\vec{I_d})_0$ statistically by adding to it the sum of the correction vectors $\epsilon\vec{I_n}$.

In a preferred mode of application of the method according to the invention, on each iteration k and for each iterative current vector $(\vec{I_n})_k$ calculated that converges towards the real current vector $\vec{I_n}$ from iteration zero using the measured current vectors $(\vec{I_n})_0$, the iterative convergence algorithm determines a partial correction vector $(\epsilon\vec{I_n})_k$ to be added to said iterative current vector $(\vec{I_n})_k$ to form the current vector $(\vec{I_n})_{k+1}$ of the next iteration k+1, said partial correction vector $(\epsilon\vec{I_n})_k$ being collinear with the erroneous differential current vector $(\vec{I_d})_0$ of the opposite direction whose normalized value is the same as that of the normalized vector product of each iterative current vector $(\vec{I_n})_k$ and the iterative erroneous current vector $(\vec{I_d})_k$ weighted by a coefficient $\lambda$ affecting the rate of convergence of the algorithm and in the range from zero to one.

In another mode of application of the method according to the invention, a new test of the set of currents of the protected area is carried out during a series of tests as soon as two correction vectors $(\epsilon\vec{I_n})_{t1}$ and $(\epsilon\vec{I_n})_{t2}$ calculated over two consecutive tests of the real current vector $\vec{I_n}$ of the same current transformer $CT_n$ correspond to two gain corrections $(dg_n)_{t1}$ and $(dg_n)_{t2}$ whose percentage difference is greater than a particular reference value r, and the statistical balancing method is applied for a statistically greater number $N_T$ of tests as the number $N_c$ of currents in the protected area increases.

In another mode of application of the method according to the invention, a partial correction vector $(\epsilon\vec{I_n})_k$ obtained at the time of an iteration is ignored if its modulus is greater than a particular percentage of the modulus of the erroneous differential current vector $(\vec{I_d})_0$, in order to be able to distinguish a differential current caused by a fault on the set of busbars from the erroneous differential current $(\vec{I_d})_0$.

In another mode of application of the method according to the invention, the correction vectors $\epsilon\vec{I_n}$ obtained for the set of current vectors $(\vec{I_n})_0$ measured at the time of a test are processed to provide for each current transformer $CT_n$ an instantaneous gain correction matrix and an instantaneous relative phase correction matrix to be applied respectively to the gain and the phase-shift introduced by the transformer. A stabilized gain or relative phase correction matrix is produced for each current transformer $CT_n$ at the end of a series of tests and corresponds to the convergence of the instantaneous correction matrices of the current transformer obtained during the tests of the series.

In another mode of application of the method according to the invention, tabulated data and functions of the various configurations of the available numbers NC of currents and NT of tests provide an indication of the quality of convergence in modulus and in phase of the statistical correction to be applied to the measured differential current vector, said statistical correction being calculated after a particular number NT of tests and converging towards the optimum statistical correction, which is obtained after a number NT of tests that increases as the number NC of currents increases.

BRIEF DESCRIPTION OF THE DRAWINGS

The invention, its features and its advantages are explained in the following description, which is given with reference to the figures listed below.

FIG. 1 is a diagram showing an area of a set of three-phase busbars constituting a current node for each phase.

FIG. 1a shows, for a given phase, the application of the law of nodes to the area from FIG. 1.

FIG. 2 is a diagram showing an application of a statistical balancing method to measurements supplied by current transformers.

MORE DETAILED DESCRIPTION

Figure 3:
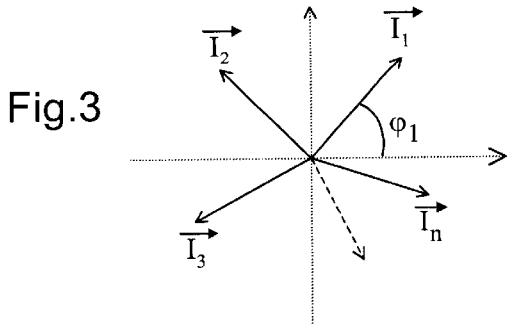
FIG. 3 shows, for a given phase, the vector relationship of the law of nodes for measurements supplied by perfect current transformers.

FIG. 1 shows diagrammatically an area of a set of three-phase busbars (R,S,T) including feeder bays than can supply or consume energy. Each feeder bay is equipped with at least one current transformer (CT) per phase, so that each current entering or leaving the node constituted by a phase of the area can be measured. In the example shown in the figure, the set of busbars comprises a total number z of feeders of which m feeders are incoming feeders. For a given phase, for example the phase R, each current $I_n$ measured at a feeder is subject to a particular relative phase ($f_n$) specific to the current transformer and resulting in particular from characteristics of the secondary of the transformer and what can be connected to it.

FIG. 1a shows, for a given phase, the application of the law of nodes to the incoming and outgoing currents of a set of busbars in the absence of a fault. The current I flowing through the set of busbars is equal to the sum of the incoming currents and to the sum of the outgoing currents (normalized values), whence the following equation: $I_1 + \ldots + I_m - (I_n + \ldots + I_z) = 0$.

FIG. 2 is a diagram showing application of a statistical balancing method to the measured values $\vec{I_1}, \vec{I_2}, \vec{I_m}, \vec{I_n}$ of the current vectors of the same phase of an area of a set of busbars. The measurement of each alternating real current vector $\vec{I_n}$ by a current transformer $CT_n$ consists firstly of extracting the relative phase $f_n$ and the modulus $I_n$ of the vector. The measured alternating current modulus is usually affected by a small DC component or offset d. An amplifier unit A filters this DC component so that only the alternating current is amplified. However, the amplifier of a current transformer $CT_n$ is usually not perfect, and is subject to a positive or negative algebraic gain error $dg_n$. The algebraic error in the measured current $(I_n)_0$ is then equal to the true current $I_n$ multiplied by the algebraic gain error $dg_n$. The amplifier also introduces a phase error $df_n$ consisting of a lead or lag time τ on the input phase. Thus the output values $(I_n)_0$ and $(f_n)_0$ are each subject to an error relative to the real input values. For the same current phase, the erroneous values $(I_n)_0$ and $(f_n)_0$ from each current transformer $CT_n$ are recovered by one or more acquisition and processing units FU, each of which includes a module SB for implementing the method in accordance with the invention of correcting measurements by statistical balancing. The method determines for each measured current vector $(I_n)_0$ the correction vector $\vec{\epsilon I_n}$ to be added to it to obtain a corrected current vector $\vec{I_{n\,c}}$ substantially equal to the real current vector $\vec{I_n}$. Note that the corrected current vector $\vec{I_{n\,c}}$ is statistically much closer to $\vec{I_n}$ than the measured current vector $(\vec{I_n})_0$, but that it is possible to have the opposite relationship for a few current transformers from the set.

FIG. 3 shows for a given phase the vector relationship of the law of nodes for measurements supplied by perfect current transformers. Because of the relative phase ($f_n$) of each measured current $I_n$, the vector $\vec{\Sigma I_n}$ of the currents is a null vector.

Figure 4:
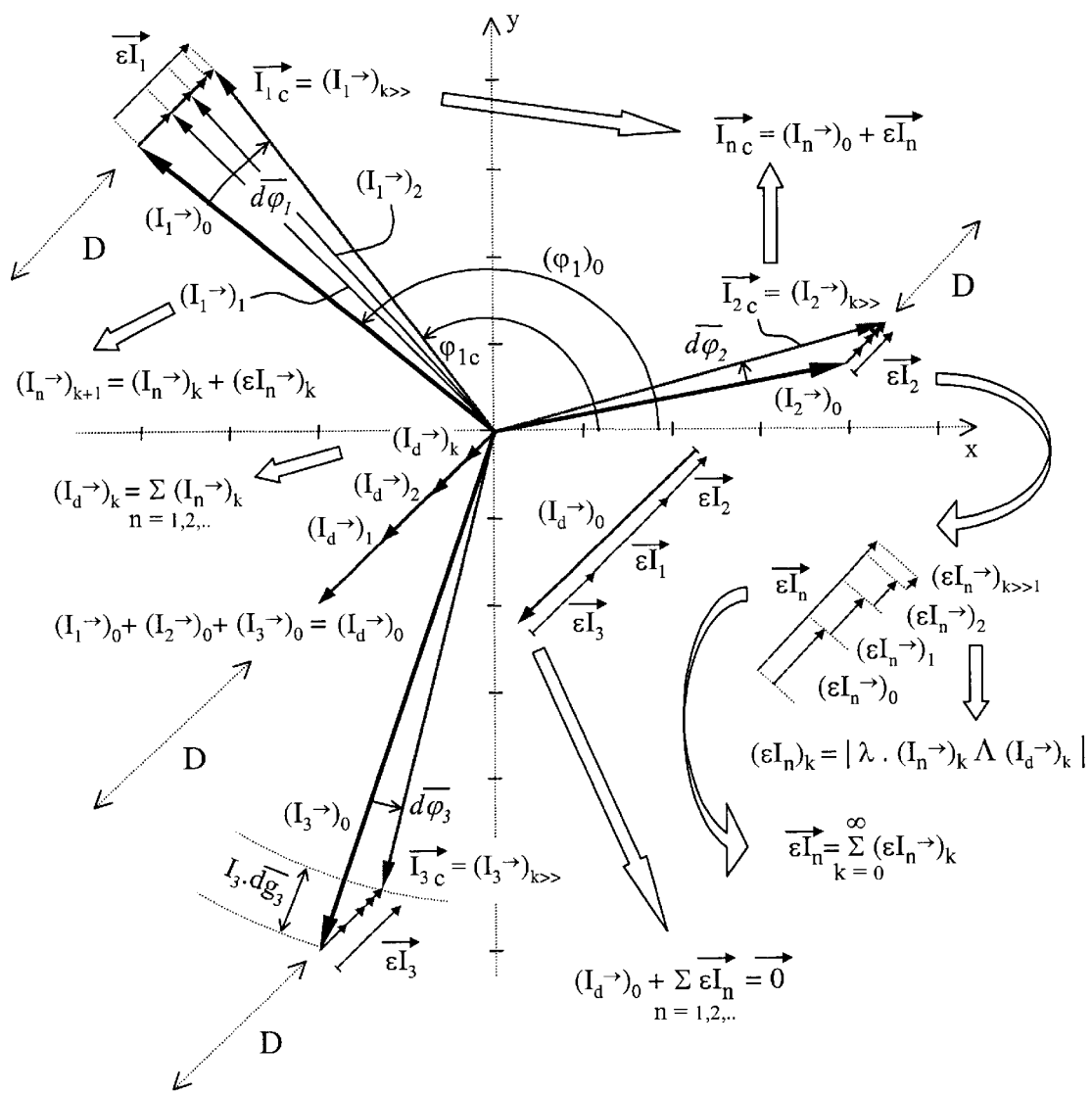
FIG. 4 shows, for a given phase, the principle of correcting current vector measurements for iterative convergence.

FIG. 4 shows, for a given phase, the principle of correcting current vector measurements $(\vec{I_n})_0$ by iterative convergence following a test of measurements in a preferred embodiment of the method according to the invention in which the convergence algorithm applies iterative corrections based on vector products. To simplify the diagram, the figure relates to an example in which only three currents ($I_1$, $I_2$ and $I_3$) pass through the same phase of an area of set of busbars, but it must be understood that the method is of most benefit when the number of currents approaches or exceeds about ten. The erroneous differential current $(\vec{I_d})_0$ is obtained by summing the measured current vectors $(\vec{I_1})_0$, $(\vec{I_2})_0$, and $(\vec{I_3})_0$. The figure shows measured current vectors with exaggeratedly different moduli so that their sum yields a relatively large vector $(\vec{I_d})_0$. In reality, it is only from a larger number of currents that there is a risk of there being an erroneous differential current of this magnitude while testing measurements.

The measurement correction principle basically consists of determining for each measured current vector $(\vec{I_n})_0$ the correction vector $\vec{\epsilon I_n}$ to be applied to obtain a corrected current vector $\vec{I_{n\,c}}$ as close as possible to the real current vector $\vec{I_n}$. The real current vectors $\vec{I_n}$ are not known, of course, but it is known that in the absence of a fault they must have a null sum. The following equations therefore apply:

$$\Sigma(\vec{I_n})_0 = (\vec{I_d})_0|$$

$$\vec{I_{n\,c}} = (\vec{I_n})_0 + \vec{\epsilon I_n}|, \text{ whence } \Sigma \vec{I_{n\,c}} = (\vec{I_d})_0 + \Sigma \vec{\epsilon I_n}$$

Because $\Sigma \vec{I_{n\,c}} \cong 0 = \Sigma \vec{I_n}$, then $\Sigma \vec{\epsilon I_n} + (\vec{I_d})_0 = 0$ The choice is made to orient each correction vector $\vec{\epsilon I_n}$ collinearly with the erroneous differential current vector $(\vec{I_d})_0$ and in the opposite direction to satisfy the preceding vector relationship. Then the equation $\Sigma \epsilon I_n = (I_d)_0$ applies for normalized values. It remains to determine normalized values for each correction $\epsilon I_n$. The algorithm consists in a series of partial correction vectors $(\vec{\epsilon I_n})_k$ whose sum $\Sigma_k (\vec{\epsilon I_n})_k$ converges towards the correction $\vec{\epsilon I_n}$. If the convergence is effected without oscillation, which is the case in the example shown in FIG. 4, the equation is also valid for normalized values and can be written: $\Sigma_k (\epsilon I_n)_k \rightarrow \epsilon I_n$.

Each partial correction vector $(\epsilon I_n)_k$ is equal to the normalized vector product of each iterative current vector $(\vec{I_n})_k$ and the iterative erroneous differential current vector $(\vec{I_d})_k$ weighted by a coefficient $\lambda$ affecting the rate at which the algorithm converges and in the range from zero to one. The calculation begins at the iteration k=0 and the mathematical relation is:

$$(\epsilon I_n)_k = |\lambda \cdot (\vec{I_n})_k \wedge (\vec{I_d})_k|$$

In each test of measurements there is an ideal coefficient value $\lambda_c$ that would cause convergence towards the correction $\epsilon I_n$ in a single pass, and therefore such that:

$$\epsilon I_n = |\lambda_c \cdot (\vec{I_n})_0 \wedge (\vec{I_d})_0| = \pi_c \times (I_n)_0 \times (I_d)_0 \times \sin[(\vec{I_n})_0, (\vec{I_d})_0]$$

Note that the correction $\epsilon I_n$ is proportional to the modulus of the measured current vector $(\vec{I_n})_0$ to which it applies. This is logical because the exact error in the measured current $(I_n)_0$ is equal to $I_n \times dg_n$, i.e. virtually equal to $(I_n)_0 \times dg_n$. Similarly, it can be verified that the correction $\epsilon I_n$ is proportional to the modulus of the erroneous differential current vector $(\vec{I_d})_0$.

Because the value of $\pi_c$ is indeterminate, it is necessary to proceed by iteration to achieve convergence, with an arbitrary coefficient $\pi$. The closer the coefficient $\pi$ to the ideal coefficient $\pi_c$, the faster the convergence.

On passing from an iteration k to an iteration k+1, an iterative current vector $(\vec{I_n})_{k+1}$ and an iterative erroneous differential current vector $(\vec{I_d})_{k+1}$ are calculated in the following manner:

$$(\vec{I_n})_{k+1} = (\vec{I_n})_k + (\epsilon \vec{I_n})_k$$

and $(\vec{I_d})_{k+1} = \Sigma_n (\vec{I_n})_{k+1} = (\vec{I_d})_k + \Sigma_n (\epsilon \vec{I_n})_k$ Accordingly, between two iterations $\underline{k}$ and k+1, the normalized value of the iterative erroneous differential current vector $(\vec{I_d})_k$ is reduced by $\Sigma_n(\epsilon \vec{I_n})_k$. Depending on the coefficient $\pi$ chosen, the normalized value of the vector $(\vec{I_d})_k$ and that of each vector $(\epsilon \vec{I_n})_k$ will converge more quickly or less quickly towards 0 on each new iteration $\underline{k}$.

In this way the convergence algorithm is applied to each measured current vector $(\vec{I_n})_0$ at the time of a test to obtain the set of correction vectors $\vec{\epsilon I_n}$ to be applied to the set of measurements effected by the current transformers $CT_n$.

During a test of measurements, it must be possible to distinguish a differential current caused by a fault on the set of busbars from the measured erroneous differential current $(\vec{I_d})_0$. This is because a measured differential current must not be interpreted as the result of gain errors of the current transformers $CT_n$ if that measurement results from a real fault current existing at the time of the measurement. One way to minimize any such eventuality in the correction process is to provide for a partial correction vector $(\epsilon \vec{I_n})_k$ obtained at the time of an iteration to be ignored if its modulus is greater than a particular percentage of the modulus of the erroneous differential current vector $(\vec{I_d})_0$. In the FIG. 4 example, the normalized value of the partial correction vector $(\epsilon \vec{I_I})_1$ for passing from the measured current $(\vec{I_I})_0$ to the iterative current vector $(\vec{I_I})_1$ represents almost 20% of the modulus of the erroneous differential current vector $(\vec{I_d})_0$. In this illustration, the gain errors are exaggerated because a percentage like this in excess of 10% in reality signifies that there is a real fault current. The discrimination threshold is usually chosen in the range from 1% to 10% of the modulus of the erroneous differential vector $(\vec{I_d})_0$.

For each test, the correction vectors $\vec{\epsilon I_n}$ can be processed to obtain for each current transformer $(CT_n)$ an instantaneous gain correction matrix and an instantaneous relative phase correction matrix to be respectively applied to the gain and the relative phase introduced by the transformer. The correction is "instantaneous" in the sense of a period of time that is relatively short compared to the time between two consecutive tests. It must be understood that a test of measured current vectors $(\vec{I_n})_0$ generally provides measurements that have each already been averaged over a short period, for example of the order of 10 seconds. The average time between two tests is generally much longer, in order to take into account statistical changes that can affect all the currents over time. The greater the number of currents, the greater the risk of modification of the configuration of the currents and the greater the need to perform a series of tests comprising a large number of tests to reflect a stable current configuration. In order for a series of tests not to stop when a current is not stabilized, a new test of the set of currents of the protected area is performed, for at least one current transformer $CT_n$, as soon as two correction vectors $(\vec{\epsilon I_n})_{t1}$ and $(\vec{\epsilon I_n})_{t2}$ calculated over two consecutive tests correspond to two gain corrections $(dg_n)_{t1}$ and $(dg_n)_{t2}$ whose percentage difference (absolute value) is greater than a particular reference value $\underline{r}$. For a test of a current transformer $CT_n$, for example, if a gain correction $(dg_n)t_1$ equal to 1% is measured at a time $t_1$ and a gain correction $(dg_n)t_2$ equal to 0.8% is measured at a time $t_2$ corresponding to the next test, the percentage difference is equal to 20% in this case, which means that a new test is performed if the reference value $\underline{r}$ is set at less than 20%. A series of tests can therefore continue until there remains no current transformer for which said percentage difference exceeds the reference value, i.e. until no further significant variation of current is observed.

At the end of a series of tests consisting of a sufficient number $N_T$ of tests for the currents observed to have stabilized, a stabilized gain or relative phase correction matrix can be obtained for each current transformer $CT_n$, and corresponds to convergence of the correction matrices of that current transformer obtained during each test of the series, in order for said stabilized correction matrices to reflect a stable current configuration.

The characteristics of differential busbar protection current transformers are usually not perfectly stable over a long period, of the order of six months or a year. Firstly, a current transformer $CT_n$ may fail and have to be replaced, whence a change of gain error because of the new transformer. Also, the gain of a current transformer $CT_n$ usually varies as it ages or with climatic conditions. It is therefore necessary to repeat series of tests regularly over the course of a year in order to recompute the stabilized gain or relative phase correction matrices corresponding to changes in the characteristics of the transformers.

Figure 5:
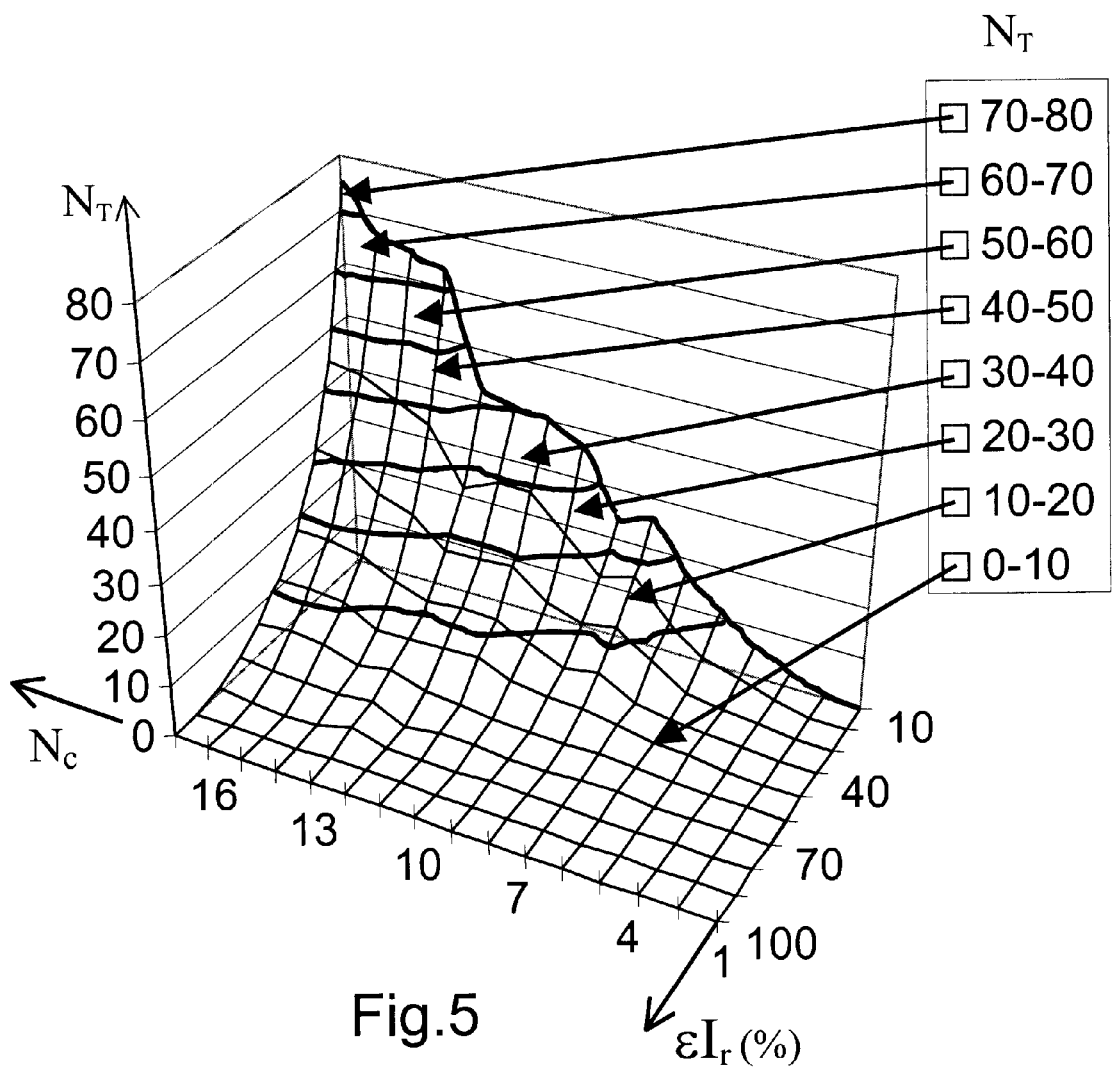
FIG. 5 is a graph showing computation by simulation of the quality of convergence of the statistical correction to be applied to the modulus of the measured differential current vector.

FIG. 5 is a graph which shows calculation by simulation of the quality of convergence of the statistical correction to be applied to the modulus of the differential current vector measured for a differential protection configuration measuring a number $N_C$ of currents. The magnitude $\epsilon I_r$ represents the relative percentage error between said statistical correction calculated after a particular number $N_T$ of tests and the optimum statistical correction corresponding to a series of tests comprising a sufficient number of tests for no further significant variation of currents to be observed at the end of the series. The convergence of the statistical correction improves as the value of $\epsilon I_r$ to which it corresponds falls. For example, for six or seven currents, ten to twenty tests must be carried out for the relative error percentage $\epsilon I_r$ to remain below 10%. It can therefore be stated that a statistical correction calculated over ten to twenty tests represents a good quality of convergence towards the optimum statistical correction corresponding to a large number of tests and for which, by definition, $\epsilon I_r$ is close to zero. It can be verified that the greater the number of currents, the more tests must be carried out for the statistical correction after $N_T$ tests to be close to the optimum statistical correction. A graph of the same type can be calculated to represent the convergence quality $\epsilon f_r$ of the statistical correction to be applied to the phase of the measured differential current vector. If a series of tests must be limited to a number $N_T$ of tests that is too small to obtain an optimum statistical correction, the data from these graphs can be tabulated to determine the relative errors that remain in the statistical modulus and phase corrections.

What is claimed is:

1. A method of correcting measurements from current transformers disposed at inputs and outputs of a current node defined by an area and by a phase of a set of busbars, intended to limit the risk of unnecessary tripping of a differential phase current protection system, said differential protection system calculating the vector sum of the currents to determine the differential current between the inputs and outputs of said area in the course of regular tests, which method is based on a statistical balancing method using measured current vectors each obtained from a measurement of the current and the relative phase of the real current vector supplied at the time of each test by a current transformer, and it uses at the time of at least one test an iterative convergence algorithm for determining from the erroneous differential current vector formed by the sum of the measured current vectors the correction vector to be applied to each measured current to obtain a corrected current vector substantially equal to the real current vector, in order to correct statistically said erroneous differential current vector.

2. A measurement correction method according to claim 1, wherein on each iteration and for each iterative current vector calculated that converges towards the real current vector from iteration zero using the measured current vectors, the iterative convergence algorithm determines a partial correction vector to be added to said iterative current vector to form the current vector of the next iteration, said partial correction vector being collinear with the erroneous differential current vector of the opposite direction whose normalized value is the same as that of the normalized vector product of each iterative current vector and the iterative erroneous current vector weighted by a coefficient $\pi$ affecting the rate of convergence of the algorithm and in the range from zero to one.

3. A measurement correction method according to claim 1, wherein a new test of the set of currents of the protected area is carried out during a series of tests as soon as two correction vectors calculated over two consecutive tests of the real current vector of the same current transformer correspond to two gain corrections whose percentage difference is greater than a particular reference value, and wherein the statistical balancing method is applied for a statistically greater number of tests as the number of currents in the protected area increases.

4. A measurement correction method according to claim 3, wherein the reference value is lower than 20%.

5. A measurement correction method according to claim 1, wherein a partial correction vector obtained at the time of an iteration is ignored if its modulus is greater than a particular percentage of the modulus of the erroneous differential current vector, in order to be able to distinguish a differential current caused by a fault on the set of busbars from the erroneous differential current.

6. A measurement correction method according to claim 1, wherein the correction vectors obtained for the set of current vectors measured at the time of a test are processed to provide for each current transformer an instantaneous gain correction matrix and an instantaneous relative phase correction matrix to be applied respectively to the gain and the relative phase introduced by the transformer.

7. A measurement correction method according to claim 6, wherein a stabilized gain or relative phase correction matrix is produced for each current transformer at the end of a series of tests and corresponds to the convergence of the correction matrices of the current transformer obtained during the tests of the series, so that said stabilized correction matrices reflect a stable current configuration.

8. A measurement correction method according to claim 1, wherein tabulated data and functions of the various configurations of the available numbers of currents and of tests provide an indication of the quality of convergence in modulus and in phase of the statistical correction to be applied to the measured differential current vector, said statistical correction being calculated after a particular number of tests and converging towards the optimum statistical correction.

* * * * *